United States Patent
Karroumi et al.

(10) Patent No.: US 8,520,846 B2
(45) Date of Patent: Aug. 27, 2013

(54) METHOD AND DEVICE FOR KEY GENERATION

(75) Inventors: Mohamed Karroumi, Rennes (FR); Ayoub Massoudi, Issy les Moulineaux (FR)

(73) Assignee: Thomson Licensing, Boulogne-Billancourt (FR)

( * ) Notice: Subject to any disclaimer, the term of this patent is extended or adjusted under 35 U.S.C. 154(b) by 97 days.

(21) Appl. No.: 12/737,458

(22) PCT Filed: Jul. 13, 2009

(86) PCT No.: PCT/EP2009/058916
§ 371 (c)(1),
(2), (4) Date: Jun. 3, 2011

(87) PCT Pub. No.: WO2010/007021
PCT Pub. Date: Jan. 21, 2010

(65) Prior Publication Data
US 2011/0228930 A1   Sep. 22, 2011

(30) Foreign Application Priority Data

Jul. 18, 2008  (EP) ..................... 08305406
Oct. 27, 2008  (EP) ..................... 08305735

(51) Int. Cl.
*H04L 9/00* (2006.01)
*H04L 9/28* (2006.01)
(52) U.S. Cl.
USPC ............................ 380/44; 380/28
(58) Field of Classification Search
USPC .................................. 380/47, 44
See application file for complete search history.

(56) References Cited

U.S. PATENT DOCUMENTS

2002/0150240 A1 * 10/2002 Henson et al. ........... 380/44
2003/0039358 A1 *  2/2003 Scheidt et al. .......... 380/47

FOREIGN PATENT DOCUMENTS
EP        1921858        5/2008

OTHER PUBLICATIONS

Imaizumi et al., "Collusion Attack-Resilient Hierarchical Encryption of JPEG 2000 Codestreams with Scalable Access Control", Proceedings 2007 IEEE International Conference on Image Processing, ICIP 2007, pp. II-137.
Imaizumi et al., "Generalized Hierarchical Encryption of JPEG 2000 Codestreams for Access Control", Image Processing, 2005, IEEE International Conference, vol. 2, Genova, Italy, Sep. 11-14, 2005, pp. 1094-1097.
Hashimoto et al., "Hierarchical Encryption Using Short Encryption Keys for Scalable Access Control of JPEG 2000 Coded Images", IMAGE Processing 2008, 15h IEEE International Conference, Oct. 12, 2008, pp. 3116-3119.
Search Report Dated Oct. 22, 2009.

* cited by examiner

Primary Examiner — Krista Zele
Assistant Examiner — Esther Benoit
(74) Attorney, Agent, or Firm — Tutunjian & Bitetto, P.C.

(57) ABSTRACT

A method of generating a segment key $KS_{mt}$ from a given basic key $K_{mT}$ and a given modification key $K'_{MT}$ in a key space with M*T keys. The basic key $K_{MT}$ is split into two parts $L_{mT}$, $R_{mT}$ onto which a one-way function is applied M−m and T−t times, respectively, and the results are combined again to form a target basic key. A one-way function is applied to the modification key $K'_{MT}$ a number of times that corresponds to a distance value z between the given basic key and the segment key; in one preferred embodiment z=(M−m)+(T−t). This result is XOR-ed with the target basic key to obtain the segment key $KS_{mt}$. Also provided is a device.

12 Claims, 2 Drawing Sheets

|       | t = 3 | t = 2 | t = 1 |
|---|---|---|---|
| m = 3 | $KS_{33}=L_{33}\|\|R_{33}$ | $KS_{32}=(L_{33}\|\|H_2(R_{33}))$ XOR $H_3^1(K'_{33})$ | $KS_{31}=(L_{33}\|\|H_2^2(R_{33}))$ XOR $H_3^3(K'_{33})$ |
| m = 2 | $KS_{23}=(H_1(L_{33})\|\|R_{33})$ XOR $H_3^1(K'_{33})$ | $KS_{22}=(H_1(L_{33})\|\|H_2(R_{33}))$ XOR $H_3^2(K'_{33})$ | $KS_{21}=(H_1(L_{33})\|\|H_2^2(R_{33}))$ XOR $H_3^4(K'_{33})$ |
| m = 1 | $KS_{13}=(H_1^2(L_{33})\|\|R_{33})$ XOR $H_3^3(K'_{33})$ | $KS_{12}=(H_1^2(L_{33})\|\|H_2(R_{33}))$ XOR $H_3^4(K'_{33})$ | $KS_{11}=(H_1^2(R_{33})\|\|H_2^2(R_{33}))$ XOR $H_3^6(K'_{33})$ |

|  | t = 3 | t = 2 | t = 1 |
|---|---|---|---|
| m = 3 | $KS_{33}=L_{33}\|\|R_{33}$ | $KS_{32}=(L_{33}\|\|H_2(R_{33}))$ XOR $H_3^1(K'_{33})$ | $KS_{31}=(L_{33}\|\|H_2^2(R_{33}))$ XOR $H_3^3(K'_{33})$ |
| m = 2 | $KS_{23}=(H_1(L_{33})\|\|R_{33})$ XOR $H_3^1(K'_{33})$ | $KS_{22}=(H_1(L_{33})\|\|H_2(R_{33}))$ XOR $H_3^2(K'_{33})$ | $KS_{21}=(H_1(L_{33})\|\|H_2^2(R_{33}))$ XOR $H_3^4(K'_{33})$ |
| m = 1 | $KS_{13}=(H_1^2(L_{33})\|\|R_{33})$ XOR $H_3^3(K'_{33})$ | $KS_{12}=(H_1^2(L_{33})\|\|H_2(R_{33}))$ XOR $H_3^4(K'_{33})$ | $KS_{11}=(H_1^2(R_{33})\|\|H_2^2(R_{33}))$ XOR $H_3^6(K'_{33})$ | her hands on them). As the attacker has two master keys

METHOD AND DEVICE FOR KEY GENERATION

This application claims the benefit, under 35 U.S.C. §365 of International Application PCT/EP 2009/058916, filed Jul. 13, 2009, which was published in accordance with PCT Article 21(2) on Jan. 21, 2010 in English and which claims the benefit of European patent applications No. 08305406.4, filed on Jul. 18, 2008 and No. 08305735.6, filed on Oct. 27, 2008.

FIELD OF THE INVENTION

The present invention relates generally to digital content protection, and in particular to generation of encryption and decryption keys from an initial key.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

WO 2008/055900 teaches a system for generation of encryption and decryption keys from an initial 'master' key. The system may advantageously be used in MPEG-4 to provide a receiver with a single key from which the decryption keys for lower enhancement layers may be generated. FIG. 1 illustrates the key generation for two times two (i.e. four) enhancement layers. A receiver that has access to key 2,2 may generate keys 1,2; 2,1; and 1,1 by applying one-way functions, advantageously hashes, to a specific part of the 'master' key. For example, to generate key 2,1, the receiver concatenates the left-hand side of key 2,2—$L_{2,2}$—with the hash value—$H(R_{2,2})$—of the right-hand side of key 2,2—$R_{2,2}$.

Similarly, to generate key 1,2, the receiver concatenates the right-hand side of key 2,2—$R_{2,2}$—with the hash value—$H(L_{2,2})$—of the left-hand side of key 2,2—$L_{2,2}$. Key 1,1 may be generated from either of keys 2,2; 2,1; and 1,2. The skilled person will appreciate that Key 1,1=$L_{1,2}||H(R_{1,2})$=$H(L_{2,2})||H(R_{2,2})$ calculated via key 1,2, is equal to:

Key 1,1=$H(L_{2,1})||R_{2,1}$=$H(L_{2,2})||H(R_{2,2})$ calculated via key 2,1.

The skilled person will also appreciate that as the functions that are used to modify the keys are one-way, it is not computationally feasible to generate key 3,2 from key 2,2 or from key 3,1 (although the opposite is possible).

As will be seen, WO 2008/055900 presents a drawback. It will therefore be appreciated that there is a need for a content protection system that overcomes the drawback of the prior art. This invention provides such a solution.

SUMMARY OF THE INVENTION

In a first aspect, the invention is directed to a method of generation of a target key in a n-dimensional key space, n being an integer greater than or equal to two, each key corresponding to a coordinate in the key space, the target key corresponding to coordinate (x,y, . . . ). A starting basic key $K_{MT}$ having coordinates (X,Y, . . . ) composed by n values is obtained and split into n key parts, each key part corresponding to one dimension. For each dimension, a one-way function is applied, to the key part corresponding to the dimension, a number of times equal to the maximum coordinate value for the dimension minus the coordinate of the dimension of the target key, so as to obtain a target basic key part. The n target basic key parts are combined to obtain a target basic key. A starting modification key $K'_{MT}$ is obtained. A distance value that expresses, as an integer, the distance in the key space between the starting modification key $K'_{MT}$ and the target key is generated. A one-way function is applied to the starting modification key $K'_{MT}$ a number of times equal to the distance value so as to obtain a target modification key. Then the target basic key and the target modification key are combined to obtain the target key.

In a first preferred embodiment, n is equal to 2.

In a second preferred embodiment, the target basic key and the target modification key are XOR-ed.

In a third preferred embodiment, the distance value is calculated by adding the difference between the coordinates of the starting basic key $K_{MT}$ and the target key for each dimension.

In a fourth preferred embodiment, the length of all the key parts is identical.

In a fifth preferred embodiment, the starting basic key and the starting modification key are comprised in a starting global key.

In a second aspect, the invention is directed to a device for generation of a target key in a n-dimensional key space, n being an integer greater than or equal to two, each key corresponding to a coordinate in the key space, the target key corresponding to coordinate (x,y, . . . ). The device comprises a processor adapted to: obtain a starting basic key $K_{MT}$ having coordinates (X,Y, . . . ) composed by n values; split the starting basic key $K_{MT}$ into n key parts, each key part corresponding to one dimension; apply, for each dimension, a one-way function to the key part corresponding to one dimension a number of times equal to the maximum coordinate value for the dimension minus the coordinate of the dimension of the target key, so as to obtain a target basic key part; combine the n target basic key parts to obtain a target basic key; obtain a starting modification key $K'_{MT}$; generate a distance value that expresses, as an integer, the distance in the key space between the starting modification key $K'_{MT}$ and the target key; apply a one-way function to the starting modification key $K'_{MT}$ a number of times equal to the distance value so as to obtain a target modification key; and combine the target basic key and the target modification key to obtain the target key.

BRIEF DESCRIPTION OF THE DRAWINGS

Preferred features of the present invention will now be described, by way of non-limiting example, with reference to the accompanying drawings, in which.

PREFERRED EMBODIMENT OF THE INVENTION

Figures 1, 2:
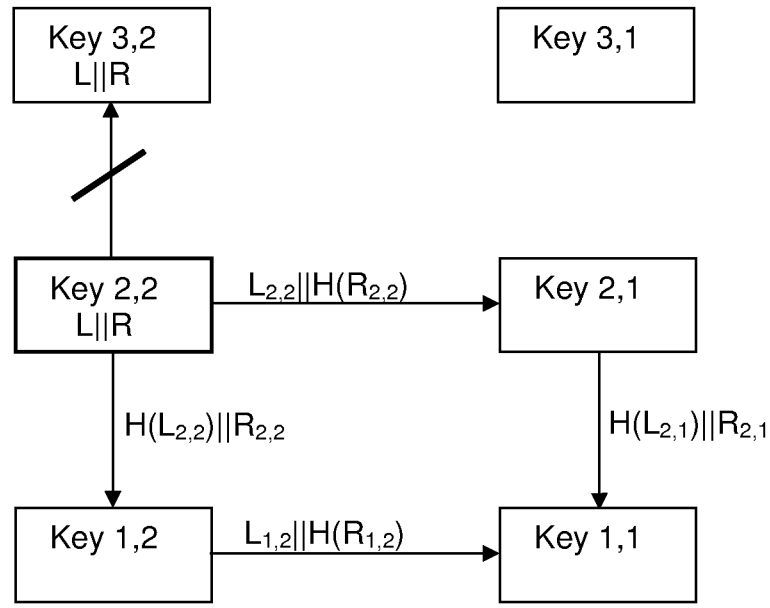
FIG. 1 illustrates key generation as taught in prior art document WO 2008/055900.
FIG. 2 illustrates how keys may be calculated from a master basic key $K_{33}$ and a master modification key $K'_{33}$ according to a preferred embodiment of the invention.

The present invention finds a raison d'être in the fact that it has been discovered however, that the solution presented in may be vulnerable to collusion attacks.

Supposing that an attacker breaks two receivers and recovers at least two protected license keys (or otherwise obtains these keys). Supposing further that one of these keys is key $\mathbf{2,1}=(L_{2,2}||H(R_{2,2}))$ and that the other key is key $\mathbf{1,2}.(H(L_{2,2})||R_{2,2})$. Neither device is able to generate key $\mathbf{2,2}$. However, by using left-hand value of key $\mathbf{2,1}=(L_{2,2}||H(R_{2,2}))$ and right side value of key $\mathbf{1,2}=(H(L_{2,2})||R_{2,2})$, the attacker is able to reconstitute the key $\mathbf{2,2}=(L_{2,2}||R_{2,2})$. This is a collusion attack; the present invention proposes a general key generation scheme with two embodiments to counter this collusion attacks.

The general scheme of the present invention develops the scheme in WO 2008/055900 by modifying the keys therein (hereinafter called 'basic keys') with a modification key to generate segment keys.

The following notation will be used hereinafter:
The key space comprises M*T different segment keys (i.e. M in one dimension and T in the other), each segment key being denoted $KS_{mt}$, where $m\epsilon\{1,\ldots,M\}$ and $t\beta\{1,\ldots,T\}$.

A 2 k-bit key $K_{mt}$ is a key such that $2^{2k-1}<K_{mt}<2^{2k}$. The k most significant bits (i.e. the left-hand part) of $K_{mt}$ is noted $L_{mt}$ and the k least significant bits (i.e. the right-hand part) $R_{mt}$; in other words $K_{mt}=L_{mt}||R_{mt}$ and could be written $L_{mt}*2^k+R_{mt}$. We do not distinguish between a key $K_{mt}$ and its representation $L_{mt}||R_{mt}$.

Key $K_{MT}$ is a 2 k-bit master basic key from which the other basic keys may be generated, preferably as in WO 2008/055900.

$H_1$, $H_2$ and $H_3$ denote one-way functions, where the size of the output of $H_1$ and $H_2$ is k bits and the size of the output of $H_3$ is 2 k bits. It is advantageous that $H_1$ are $H_2$ are identical, but this is not required. A suitable hash function for $H_1$, $H_2$ is e.g. MD5 which output is 128 bits and for H3 e.g. SHA-256 which output is 256 bits.

$K'_{MT}$ denotes a 2 k-bit master modification key that will be described hereinafter.

While modification keys are described as being distinct from basic keys, it is also possible to provide both keys in a global key that is split into a modification key and a basic key whenever necessary.

A segment key $KS_{mt}$ is generated by:
Splitting $K_{MT}$ into two parts, preferably (as in the present example) halves, so that $K_{MT}=(L_{MT}||R_{MT})$.
A first and second distance value are calculated; $x=M-m$ and $y=T-t$. A distance value expresses the difference in 'level' between the master key and the present key in a certain dimension.
An aggregate distance value z is calculated. The aggregate distance value is calculated differently depending on the embodiment.
The segment key $KS_{mt}$ is generated by calculating $$KS_{mt}=(H_1^x(L_{MT})||H_2^y(R_{MT})) XOR\ H_3^z(K'_{MT}).$$

Put another way, $KS_{mt}=K_{mt}\ XOR\ K'_{mt}$.
In a first embodiment, $z=x+y$.
In a second embodiment, z is calculated as follows:
if $x=0$ and $y=0$, $z=0$;
if $x=0$ and $y\ne 0$, $z=2^y-1$;
if $x\ne 0$ and $y=0$, $z=2^x-1$; and
if $x\ne 0$ and $y\ne 0$, $z=2^x+2^y-2$.

The key generation scheme hereinafter will now be illustrated by an example.
The following is assumed for the example:
$M=3$, $T=3$;
$H_1=H_2$ with a k-bit output; $H_3$ with a 2 k-bit output.
z is calculated according to the second embodiment.
FIG. 2 illustrates how keys $KS_{32}$, $KS_{31}$, $KS_{23}$, $KS_{22}$, $KS_{21}$, $KS_{13}$, $KS_{12}$, and $KS_{11}$ may be calculated from the master basic key $K_{33}$ and the master modification key $K'_{33}$. The skilled person will appreciate that it is preferred that the master basic key $K_{33}$ and the master modification key $K'_{33}$ are randomly or pseudo-randomly generated by a device at the head end.

Any device (at the head end or at the receiver end) may then generate any key from the master basic key $K_{33}$ and the master modification key $K'_{33}$. Expressed in a general manner, a device may generate any 'lesser' key from a 'greater' key—a lesser key having an equal or lower value in both dimensions—but not the other way around.

It is naturally also possible to generate a lesser key from one of the nearest greater keys, e.g. to generate $KS_{22}$ from either $K_{32}$, $K'_{32}$, M and T or $K_{23}$, $K'_{23}$, M and T by analogous calculations. From for example $K_{32}$ and $K'_{32}$, $KS_{22}=(H_1(L_{32})||R_{32})\ XOR\ H_3(K'_{32})$.

For further clarification, it will now be explained how the different values of z in FIG. 2 were calculated:
$m=3$, $t=2$: $x=M-m=3-3=0$; $y=T-t=3-2=1$; $z=2^y-1=2^1-1=1$;
$m=3$, $t=1$: $x=M-m=3-3=0$; $y=T-t=3-1=2$; $z=2^y-1=2^2-1=3$;
$m=2$, $t=3$: $x=M-m=3-2=1$; $y=T-t=3-3=0$; $z=2^x-1=2^1-1=1$;
$m=2$, $t=2$: $x=M-m=3-2=1$; $y=T-t=3-2=1$; $z=2^x+2^y-1=2^1+2^1-2=2$;
$m=2$, $t=1$: $x=M-m=3-2=1$; $y=T-t=3-1=2$; $z=2^x+2^y-1=2^1+2^2-2=4$;
$m=1$, $t=2$: $x=M-m=3-1=2$; $y=T-t=3-2=1$; $z=2^x+2^y-1=2^2+2^1-2=4$;
$m=1$, $t=1$: $x=M-m=3-1=2$; $y=T-t=3-1=2$; $z=2^x+2^y-1=2^2+2^2-2=6$.

The skilled person will appreciate that other suitable combination functions than XOR are possible. For example, a target key may be obtained by hashing a concatenation of the modification key and the basic key.

With the proposed scheme the collusion of two receivers having 'lesser' segment keys does not permit to compute a 'greater' segment key.

Imagine two receivers R1 and R2. R1 receives $K_{31}$ and $K'_{31}$, while R2 receives $K_{13}$ and $K'_{13}$. R1 may thus generate segment keys $KS_{31}$, $KS_{21}$, and $KS_{11}$. R2 may generate segment keys $KS_{13}$, $KS_{12}$, and $KS_{11}$. The shared segment keys are $KS_{11}$, while $KS_{31}$ and $KS_{21}$, are exclusive to R1 and $KS_{13}$ and $KS_{12}$ are exclusive to R2.

With the solution of WO 2008/055900 it was possible to generate $KS_{33}=K_{33}$ by combining $L_{31}$ from R1 and $R_{13}$ from R2. However, this is not possible in the scheme according to the present invention. To calculate $KS_{33}$, one must calculate the two keys $K_{33}$ and $K'_{33}$ As in the scheme of WO 2008/055900, $K_{33}$ is easily obtained by combining $L_{31}$ of $K_{31}$ from R1 and $R_{13}$ of $K_{13}$ from R2. However it is computationally difficult to calculate $K'_{33}$ by combining $K'_{31}$ from R1 and $K'_{13}$ from R2.

Indeed, to calculate $K'_{33}$ and thus to get $KS_{33}$ it requires the inversion of $H_3$, since $K'_{31}=K'_{13}=H_3^3(K'_{33})$. A one-way function is yet assumed to be non invertible.

It is even not possible to calculate $K'_{32}=H_3^1(K'_{33})$, $K'_{23}=H_3^1(K'_{33})$, $K'_{22}=H_3^2(K'_{33})$., and thus to generate the segment keys $KS_{32}$ $KS_{23}$ $KS_{22}$ by combining $K'_{31}$ from R1 and $K'_{13}$ from R2.

The use of modification keys $K'_{mt}$ thus brings resistance to collusion attacks to the scheme.

It will thus be appreciated that a 'greater' segment key may not be generated by a combination of features of 'lesser' segment keys.

The key generation scheme of the present invention is particularly suited for MPEG-FGS (Fine Grain Scalability) that is particularly adapted to flexible services provided by DRM (Digital Right Management) technologies.

Scalable encryption techniques if combined with a suitable key management scheme enables improved access control processes.

While the invention has been described in two dimensions, the skilled person will appreciate that it may be generalised to n dimensions by splitting the basic keys in n parts, where n preferably is a power of 2.

Figure 3:
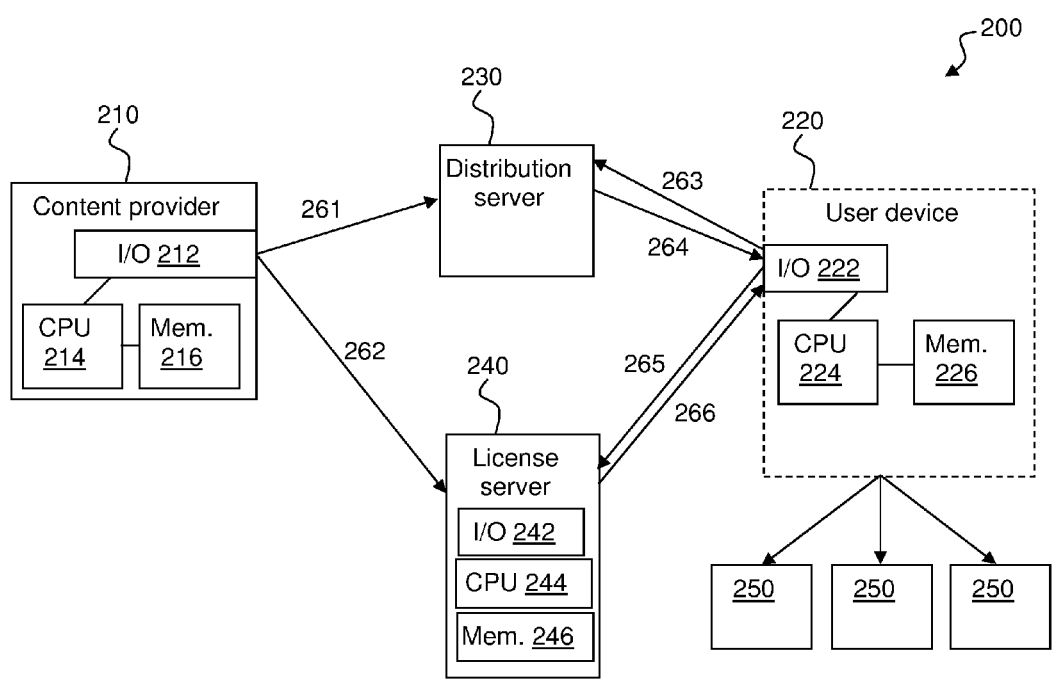
FIG. 3 illustrates a system for key generation according to a preferred embodiment of the present invention.

FIG. 3 illustrates a system for key generation and distribution according to a preferred embodiment of the present invention. The system 200 comprises a content provider 210 adapted to generate at least a master basic key $K_{MT}$ and a master modification key $K'_{MT}$. These two keys permit to generate all the segment keys. The content provider 210 is further adapted to compute all the segment keys and use them to encrypt content. The encrypted content is then transferred 261 to an appropriate distribution server 230, e.g. web server, for distribution. Then the content provider 210 sends 262 the master basic key $K_{MT}$, the master modification key $K'_{MT}$ and the necessary usage rules to a license server 240. The usage rules specify how the content should be used, typically the quality level and possible resolutions. The license server 240 is responsible for the generation and distribution of content licenses to users. At the other end, a user device 220 downloads 263, 264 the content from the distribution server 230. To be able to consume the encrypted content, the user device 220 requests 265 a license from the license server 240. The license server 240 generates a valid license that contains a basic key $K_{mt}$ and a modification key $K'_{mt}$. These two keys are calculated by the license server 240 to suit the quality requested by the user device 220. Finally, the license is securely delivered 266 to the user device 220, often after payment, and the encrypted content can be decrypted and used according to the usage rules in the license. For instance, if a user device acquires the rights for the full quality of the video, the license contains the master basic key $K_{MT}$ and a master modification key $K'_{MT}$. The license server 240 comprises an interface unit 242 for communication, at least one processor (hereinafter "processor") 244, and memory space 246 adapted to generate the license.

In the first and in the second embodiment the value of z can also be computed in a relative way, i.e from a modification key $K'_{mt}$ where $K'_{mt}$ is not necessarily the master modification key $K'_{MT}$. This works well for the first embodiment, as it is easy for the user device 220 to calculate the number of times that the one-way function should be applied to the modification key $K'_{mt}$ to obtain any lesser modification key $K'_{ij}$. However, things are a bit more complicated in the second embodiment.

Indeed, the computation of z for any modification key relative to another modification key $K'_{mt}$ requires the knowledge of M and T. In that case, the computation of z may be performed as follows:

1—Compute first $z_1$ for , e.g. $z_1 = 2^{m-i} + 2^{T-j} - 2$,
2—Compute next $z_2$ for $K'_{mt}$, e.g. $z_2 = 2^{M-m} + 2^{T-t} - 2$,
3—Finally $z = z_1 - z_2$ and $K'_{ij} = H_3^z(K_{mt})$.

Supposing that M=3, T=3, the received modification key is $K'_{22}$ and the user's device 220 calculates the lowest modification key $K'_{11}$. Then the user's device 220 will calculate $z_1$ for $K'_{11}$: $z_1 = 2^{m-1} + 2^{T-1} - 2 = 2^2 + 2^2 - 2 = 6$ and $z_2$ for $K'_{22}$: $z_2 = 2^{M-2} + 2^{T-2} - 2 = 2^1 + 2^1 - 2 = 2$. The value of z for $K'_{11}$ relative to $K'_{22}$ is $z = z_1 - z_2 = 6 - 2 = 4$. Hence, $K'_{11} = H_3^z(K'_{22}) = H_3^4(K'_{22})$. It will thus be seen that the user device needs knowledge about M and T for the key space. Thus, if the user device 220 does not already possess the values of M and T (which may be the case if for example the user device obtained these values during a registration phase or with the downloaded content, provided that the values do not change), then these values are delivered to the user device, for example in the message with the license 266.

An advantage of this model is that users can re-distribute received encrypted content to other users 250 through super-distribution, which allows scalable content to be distributed to a vast number of users having a large variety of devices (cell phones, TV sets, high end PCs, etc) without direct involvement of the distribution server. Although scalable content can be freely distributed, to access the scalable content, the recipient has to contact the license server (and to pay) to get basic and modification keys needed for segment decryption.

The content provider 210 and the user device 220 comprise an interface unit 212, 222 for communication, at least one processor (hereinafter "processor") 214, 224, and memory space 216, 226. The processor 214 of the content provider 210 is adapted to generate at least a master basic key $K_{MT}$ and a master modification key $K'_{MT}$, but is advantageously further adapted to generate all the segment keys $KS_{mt}$ and to encrypt content using the segment keys. The processor 222 of the user device 220 is adapted to generate segment keys from the keys received in the license and to decrypt content using these keys.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A method of generation of a target key in a n-dimensional key space, n being an integer greater than or equal to two, each key corresponding to a coordinate in the key space, the target key corresponding to coordinate (x,y, . . .), the method comprising the steps, at a device, of:

obtaining a starting basic key $K_{MT}$ having coordinates (X,Y, , . . .) composed by n values;

splitting the starting basic key $K_{MT}$ into n key parts, each key part corresponding to one dimension;

for each dimension, applying a one-way function to the key part corresponding to the dimension number of times, the number of times being equal to the maximum coordinate value for the dimension minus the coordinate of the dimension of the target key, so as to obtain a target basic key part; and combining the n target basic key parts to obtain a target basic key;

obtaining a starting modification key $K'_{MT}$;

generating a distance value that expresses, as an integer, the distance in the key space between the starting modification key $K'_{MT}$ and the target key; applying a one-way function to the starting modification key $K_{MT}$ a number of times equal to the distance value so as to obtain a target modification key; and XOR-ing the target basic key and the target modification key to obtain the target key.

2. The method of claim 1, wherein n is equal to 2.

3. The method of claim 1, wherein the distance value is calculated by adding the difference between the coordinates of the starting basic key $K_{MT}$ and the target key for each dimension.

4. The method of claim 1, wherein the length of all the key parts is identical.

5. The method of claim 1, wherein the starting basic key and the starting modification key are comprised in a starting global key.

6. A device for generation of a target key in a n-dimensional key space, n being an integer greater than or equal to two, each key corresponding to a coordinate in the key space, the target key corresponding to coordinate (x,y, . . .), the device comprising a processor configured to:

obtain a starting basic key $K_{MT}$ having coordinates (X, Y, . . .) composed by n values;

split the starting basic key $K_{MT}$ into n key parts, each key part corresponding to one dimension;

apply, for each dimension, a one-way function to the key part corresponding to one dimension a number of times equal to the maximum coordinate value for the dimension minus the coordinate of the dimension of the target key, so as to obtain a target basic key part; and combine the n target basic key parts to obtain a target basic key;

obtain a starting modification key $K'_{MT}$;

generate a distance value that expresses, as an integer, the distance in the key space between the starting modification key $K'_{MT}$ and the target key;

apply a one-way function to the starting modification key $K'_{MT}$ a number of times equal to the distance value so as to obtain a target modification key; and XOR the target basic key and the target modification key to obtain the target key.

7. The method of claim 1, wherein the target basic key and the target modification key are of equal length.

8. The device of claim 6, wherein n is equal to 2.

9. The device of claim 6, wherein the processor is further configured to calculate the distance value by adding the difference between the coordinates of the starting basic key $K_{MT}$ and the target key for each dimension.

10. The device of claim 6, wherein the length of all key parts is identical.

11. The device of claim 6, wherein the starting basic key and the starting modification key are comprised in a starting global key.

12. the device of claim 6, wherein the target basic key and the target modification key are of equal length.

* * * * *